US009297145B2

(12) United States Patent
Alig et al.

(10) Patent No.: US 9,297,145 B2
(45) Date of Patent: Mar. 29, 2016

(54) EXCAVATION SYSTEM PROVIDING LINKAGE PLACEMENT TRAINING

(71) Applicant: Caterpillar Inc., Peoria, IL (US)

(72) Inventors: Jeffrey Stephen Alig, Metamora, IL (US); Brad Robert Van De Veer, Washington, IL (US); Yongliang Zhu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 64 days.

(21) Appl. No.: 14/267,574

(22) Filed: May 1, 2014

(65) Prior Publication Data

US 2015/0315765 A1    Nov. 5, 2015

(51) Int. Cl.
E02F 5/02    (2006.01)
E02F 9/20    (2006.01)
E02F 1/00    (2006.01)
G09B 19/24    (2006.01)
G09B 5/00    (2006.01)

(52) U.S. Cl.
CPC ............... *E02F 9/2004* (2013.01); *E02F 1/00* (2013.01); *E02F 9/2029* (2013.01); *E02F 9/2037* (2013.01); *G09B 5/00* (2013.01); *G09B 19/24* (2013.01)

(58) Field of Classification Search
CPC ............ E02F 3/437; E02F 3/54; E02F 3/304; E02F 3/38; E02F 3/435; E02F 7/026; E02F 7/06; E02F 7/04; E02F 9/2033; E02F 9/2045; E02F 9/265; E02F 9/26; E02F 9/2004; E02F 9/2029; E02F 9/2037; G09B 5/00; G09B 19/24

USPC ........... 37/347, 348; 172/2–11, 699; 414/685, 414/694, 699, 722; 701/50, 110
See application file for complete search history.

(56) References Cited

U.S. PATENT DOCUMENTS

| | | | |
|---|---|---|---|
| 5,293,944 A | 3/1994 | Matsumoto | |
| 6,209,232 B1* | 4/2001 | Ono | E02F 3/435 37/348 |
| 6,691,437 B1* | 2/2004 | Yost | E02F 3/435 356/141.2 |
| 7,516,563 B2 | 4/2009 | Koch | |
| 8,768,579 B2* | 7/2014 | Taylor | E02F 3/437 414/694 |
| 2011/0301817 A1* | 12/2011 | Hobenshield | E02F 9/26 701/50 |
| 2012/0263566 A1 | 10/2012 | Taylor et al. | |

FOREIGN PATENT DOCUMENTS

| | | |
|---|---|---|
| CN | 101226695 | 7/2008 |
| CN | 201221102 | 4/2009 |
| JP | 3351487 | 8/1995 |

* cited by examiner

*Primary Examiner* — Robert Pezzuto
(74) *Attorney, Agent, or Firm* — Finnegan, Henderson, Farabow, Garrett & Dunner, LLP

(57) ABSTRACT

An excavation system includes a work tool, and linkage connecting the work tool to the machine. The excavation system also includes at least one sensor configured to generate a signal indicative of an angle of the linkage, a display, and a controller in communication with the at least one sensor and the display. The controller is configured to selectively cause the display to notify a user of the excavation system when the angle of the linkage is within a desired material penetration range of angles.

20 Claims, 3 Drawing Sheets

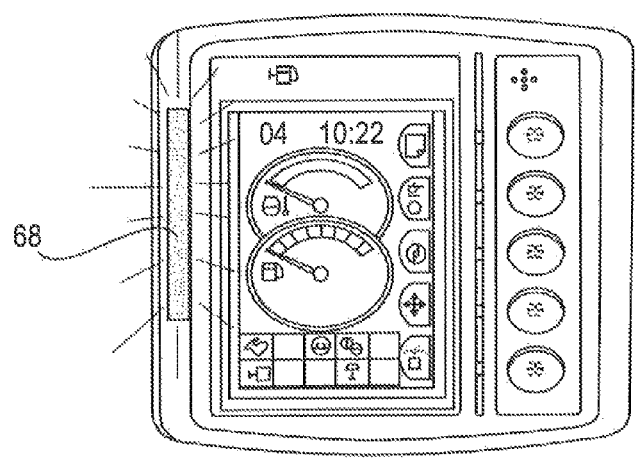
FIG. 3
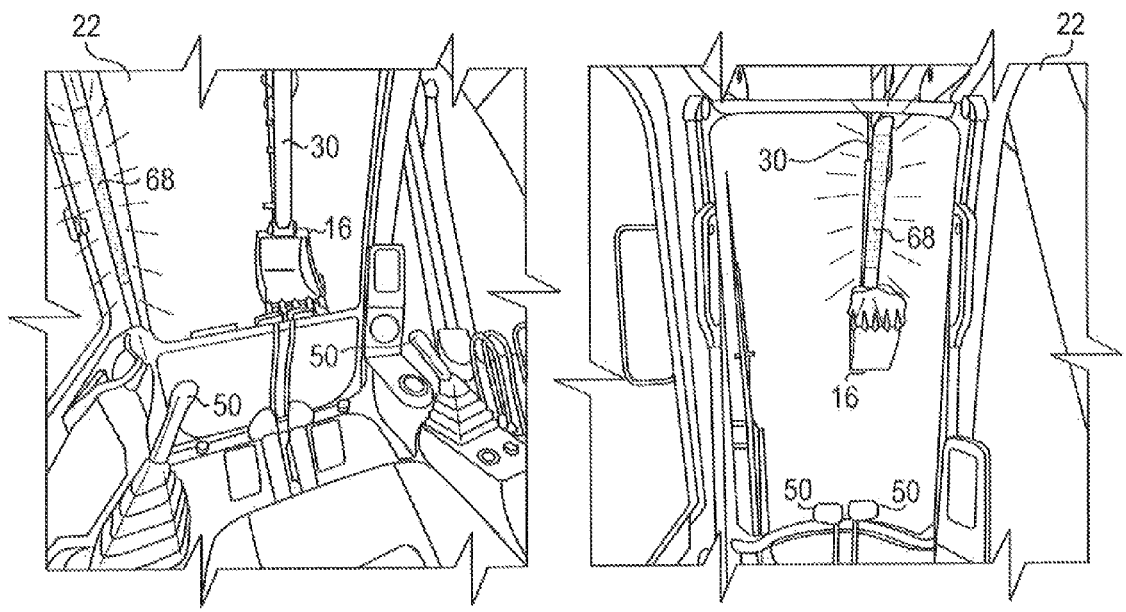
FIG. 4  FIG. 5

_US 9,297,145 B2_

EXCAVATION SYSTEM PROVIDING LINKAGE PLACEMENT TRAINING

TECHNICAL FIELD

The present disclosure relates generally to an excavation system and, more particularly, to an excavation system providing linkage placement training.

BACKGROUND

Excavation machines such as hydraulic excavators, backhoes, front shovels, draglines, and other types of heavy equipment use a work tool (e.g., a bucket) to move earthen material. The work tool is connected to a body of the machine by way of linkage, and moved about via one or more hydraulic actuators attached to different segments of the linkage. In order to be profitable, an operator must move as much material with the work tool as possible within a given period of time. And in order to move as much material as possible, the operator must correctly fill the work tool during each excavation pass of the machine. This can be difficult to do, especially if the operator is unskilled, inexperienced, or blocked from properly viewing the linkage and work tool.

One attempt to improve machine operation is disclosed in U.S. Patent Publication Application No. 2012/0263566 of Taylor et al. that published on Oct. 18, 2012 ("the '566 publication"). Specifically, the '566 publication discloses a rope shovel with an automated swing-to-hopper control system. The control system includes a controller that tracks a hoist (up/down) movement, a crowd (in/out) movement, and a swing (left/right) movement of the rope shovel. The controller then causes green LEDs to illuminate when the rope shovel is at a desired position over the hopper. When an operator of the rope shovel sees the LEDs, the operator causes the rope shovel to stop moving and dump its contents.

Although the system of the '566 publication may improve machine operation by helping the operator to properly position the rope shovel over the hopper for dumping, the system may be less than optimal. In particular, loading of the rope shovel may have a greater effect on productive material movement than positioning of the shovel during dumping. For example, transferring a greater amount of force from the shovel into the material, and subsequently loading the shove with a corresponding greater amount of material may result in greater efficiency and productivity of the rope shovel. And the automated swing-to-hopper system of the '566 publication may not affect loading of the shovel. In addition, the automated swing-to-hopper system may lack applicability to machines other than rope shovels.

The disclosed excavation system is directed to overcoming one or more of the problems set forth above and/or other problems of the prior art.

SUMMARY

One aspect of the present disclosure is directed to an excavation system for a machine. The excavation system may include a work tool, and linkage connecting the work tool to the machine. The excavation system may also include at least one sensor configured to generate a signal indicative of an angle of the linkage, a display, and a controller in communication with the at least one sensor and the display. The controller may be configured to selectively cause the display to notify a user of the excavation system when the angle of the linkage is within a desired material penetration range of angles.

Another aspect of the present disclosure is directed to a method of controlling an excavation machine having a work tool. The method may include sensing an angle of linkage connected to the work tool. The method may also include generating a notification when the angle is within a desired material penetration range of angles.

BRIEF DESCRIPTION OF THE DRAWINGS

FIGS. 3-5 are diagrammatic illustrations of different exemplary disclosed displays that may be associated with the excavation system of FIG. 2.

DETAILED DESCRIPTION

Figure 1:
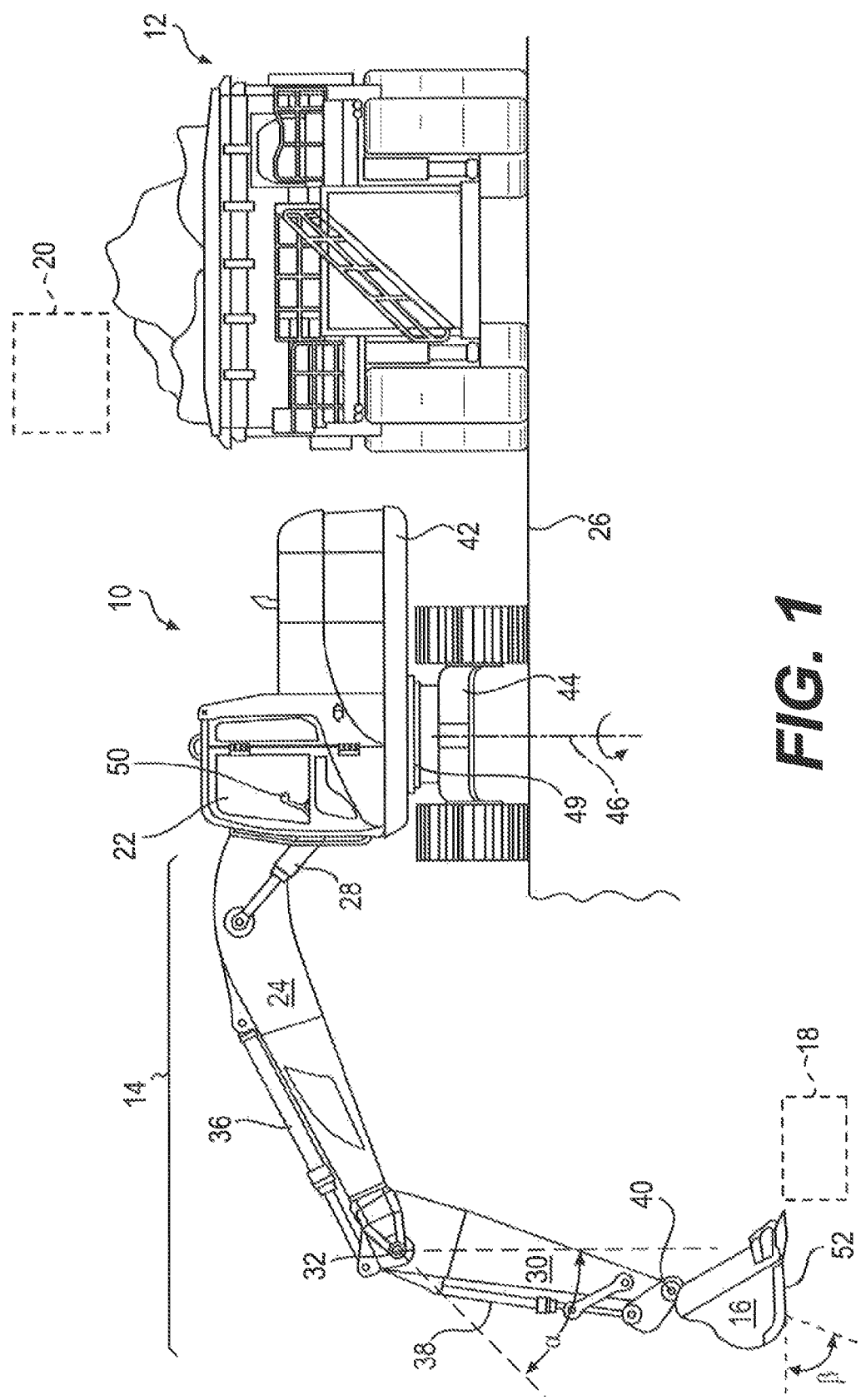
FIG. 1 is an isometric illustration of an exemplary disclosed machine.

FIG. 1 illustrates an exemplary excavation machine 10 having multiple systems and components that cooperate to excavate and load material onto a nearby haul vehicle 12. In the depicted example, machine 10 is a hydraulic excavator. It is contemplated, however, that machine 10 could alternatively embody another excavation or material handling machine, such as a backhoe, a front shovel, a dragline excavator, or another similar machine. Machine 10 may include, among other things, an excavation system 14 configured to move a work tool 16 between a dig location 18 within a trench or at a pile, and a dump location 20, for example over haul vehicle 12. Machine 10 may also include an operator station 22 for manual control of excavation system 14. It is contemplated that machine 10 may perform operations other than truck loading, if desired, such as craning, trenching, and material handling.

Excavation system 14 may include linkage acted on by fluid actuators to move work tool 16. Specifically, excavation system 14 may include a boom 24 that is vertically pivotal relative to a work surface 26 by a pair of adjacent, double-acting, hydraulic cylinders 28 (only one shown in FIG. 1). Excavation system 14 may also include a stick 30 that is vertically pivotal about a horizontal pivot axis 32 relative to boom 24 by a single, double-acting, hydraulic cylinder 36. Excavation system 14 may further include a single, double-acting, hydraulic cylinder 38 that is operatively connected to work tool 16 to tilt work tool 16 vertically about a horizontal pivot axis 40 relative to stick 30. Boom 24 may be pivotally connected to a frame 42 of machine 10, while frame 42 may be pivotally connected to an undercarriage 44 and swung about a vertical axis 46 by one or more swing motors 49. Stick 30 may pivotally connect work tool 16 to boom 24 by way of pivot axes 32 and 40. It is contemplated that a greater or lesser number of fluid actuators may be included within excavation system 14 and connected in a manner other than described above, if desired.

Numerous different work tools 16 may be attachable to a single machine 10 and controllable via operator station 22. Work tool 16 may include any device used to perform a particular task such as, for example, a bucket, a blade, a shovel, a ripper, or any other task performing device known in the art. Although connected in the embodiment of FIG. 1 to lift, swing, and tilt relative to machine 10, work tool 16 may alternatively or additionally rotate, slide, extend, open and close, or move in another manner known in the art.

Operator station 22 may be configured to receive input from a machine operator indicative of a desired work tool movement. Specifically, operator station 22 may include one or more input devices 50 embodied, for example, as single or multi-axis joysticks located proximal an operator seat (not shown). Input devices 50 may be proportional-type controllers configured to position and/or orient work tool 16 by producing a work tool position signal that is indicative of a desired work tool speed and/or force in a particular direction. The position signal may be used to actuate any one or more of hydraulic cylinders 28, 36, 38 and/or swing motor(s) 49. It is contemplated that different input devices may alternatively or additionally be included within operator station 22 such as, for example, wheels, knobs, push-pull devices, switches, pedals, and other operator input devices known in the art.

During operation of machine 10, the operator may manipulate input devices 50 from inside station 22 to raise and lower boom 24, extend and retract stick 30, and curl and rack work tool 16. And the manner in which the operator coordinates these functions can affect an amount of material moved during each phase of an excavation cycle. Specifically, a greatest amount of material may be loaded into work tool 16 when a greatest amount of force is transferred from the linkage of machine 10 into the material. And this may occur when segments of the linkage are moved within desired material penetration ranges. For example, when stick 30 is oriented at an angle α that is between about 0° (i.e., vertical and aligned with the force direction of gravity) and about 35° extended away from frame 42 during material penetration by work tool 16, and when a generally flat bottom 52 of work tool 16 is oriented at an angle β that is about orthogonal (e.g., within about ±10°) to stick 30, a greatest amount of force may be transmitted into the material and a corresponding greatest amount of material may be scooped up into work tool 16. While these ranges of angles may be common knowledge among experienced operators, controlling machine 10 in this way may be difficult to do for an inexperienced operator. For this reason, machine 10 may be provided with an excavation controller 54 that is configured to train the operator.

Figure 2:
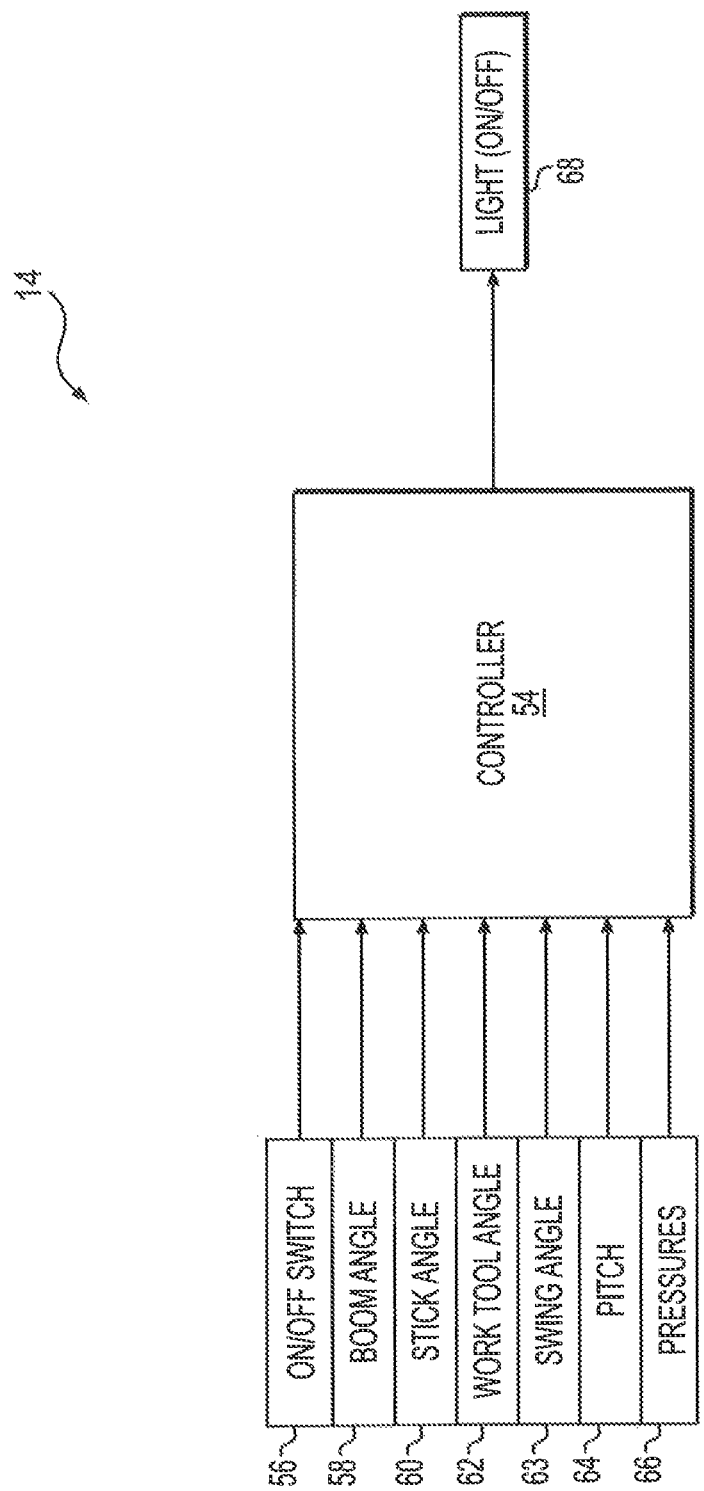
FIG. 2 is a schematic illustration of an exemplary disclosed excavation system that may be used in conjunction with the machine of FIG. 1.

As illustrated in FIG. 2, excavation controller 54 may be configured to monitor operation of machine 10 and selectively notify the operator when the movements of the linkage of machine 10 are within desired ranges that result in the highest efficiency and productivity of machine 10. In the disclosed example, controller 54 may be in communication with an on/off training switch 56 and a plurality of sensors. The sensors may include, among others, a boom angle sensor 58, a stick angle sensor 60, a work tool angle sensor 62, a swing angle sensor 63, a pitch sensor 64, and one or more pressure sensors 66. Controller 54, after receiving input from the different switches/sensors 56-64, may compare the current position of the machine's linkage to the desired ranges, and selectively cause a display 68 to notify the operator of the comparison.

Controller 54 may include a memory, a secondary storage device, a clock, and one or more processors that cooperate to accomplish a task consistent with the present disclosure. Numerous commercially available microprocessors can be configured to perform the functions of controller 54. It should be appreciated that controller 54 could readily embody a general machine controller capable of controlling numerous other functions of machine 10. Various known circuits may be associated with controller 54, including signal-conditioning circuitry, communication circuitry, and other appropriate circuitry. It should also be appreciated that controller 54 may include one or more of an application-specific integrated circuit (ASIC), a field-programmable gate array (FPGA), a computer system, and a logic circuit configured to allow controller 54 to function in accordance with the present disclosure.

On/off switch 56 may be configured to allow the operator to selectively activate a training program stored within the memory of controller 54. When switch 56 is depressed (or otherwise manipulated by the operator), controller 54 may be activated to begin monitoring machine operation and causing display 68 to selectively notify the operator regarding machine and operator performance. When controller 54 is turned off (i.e., when the training program is deactivated via switch 56), the operator may not receive performance notifications via display 68. In some instances, notifications may also be inhibited from displaying when the training program is still active, but controller 54 has determined that machine 10 is performing operations not associated with the training program (e.g., traveling or otherwise not digging material).

Boom angle sensor 58, stick angle sensor 60, and work tool angle sensor 62 may be similar and function in the same way. Specifically, each of these sensors may be configured to generate a signal indicative of a pivot angle of the corresponding linkage segment caused by its associated actuator. For example, boom angle sensor 58 may be configured to generate a signal indicative of the angle to which hydraulic cylinders 28 have pivoted boom 24 relative to machine frame 42; stick angle sensor 60 may be configured to generate a signal indicative of the angle to which hydraulic cylinders 36 have pivoted stick 30 relative to boom 24; and work tool angle sensor 62 may be configured to generate a signal indicative of the angle to which hydraulic cylinder 38 has pivoted work tool 16 relative to stick 30. Each of these sensors may take any form known in the art. For example, sensors 58-62 may be cylinder extension sensors that generate signals corresponding to an extension length of the corresponding cylinders, these lengths then being used by controller 54 to calculate the angles described above based on known kinematics of machine 10. Alternatively, sensors 58-62 could be directly associated with the pivot joints described above and configured to generate signals corresponding precisely to the pivot angles. Other types of sensors may also be utilized, as desired. Signals generated by sensors 58-62 may be directed to controller 54 for further processing.

Swing angle sensor 63, like sensors 58-62, may be configured to generate a signal indicative of a pivot angle of frame 42 relative to undercarriage 44 caused by swing motor 49. Swing angle sensor 63 may be configured to directly measure this pivot angle or, alternatively, be associated with a local or global positioning system that interfaces with local reference units and/or satellites to determine a swing angle of machine 10. Signals generated by sensor 63 may be directed to controller 54 for further processing.

Pitch sensor 64 may be configured to generate one or more signals indicative of an orientation (e.g., a pitch, roll, and/or yaw) of machine 10 (e.g., of a central point of undercarriage 44). In the disclosed embodiment, pitch sensor 64 is an Inertial Measurement Unit (IMU) having one or more accelerometers and/or gyroscopes that generate signals indicative of the change in machine orientation relative to the force of gravity. It is contemplated, however, that pitch sensor 64 could alternatively be part of a local or global positioning system that interfaces with local reference units and/or satellites to determine the orientation of machine 10. Signals generated by pitch sensor 64 may be directed to controller 54 for further processing.

Pressure sensors 66 may be associated with any one or more of hydraulic cylinders 28, 36, and 38, and configured to generate signals indicative of pressures within chambers of these cylinders. These pressures may correspond with an amount of material being carried within work tool 16 and/or particular actions being performed by excavation system 14. For example, during a digging operation, an elevated pressure may be observed within any one or all of hydraulic cylinders 28, 36, and/or 38, whereas during a traveling, swinging, and/or dumping operation the pressures within these cylinders 28, 36, 38 may be lower. Signals generated by pressure sensors 66 may be directed to controller 54 for further processing.

As will be explained in more detail below, based on the signals from switch 56 and sensors 58-66, controller 54 may be configured to determine the current position of the linkage of machine 10 at any instant in time, compare the current position to the desired ranges of angles described above, and selectively cause display 68 to notify the operator regarding the comparison. FIGS. 3-5 illustrate three alternative embodiments of display 68. In each of these embodiments, display 68 may be caused to illuminate (e.g., in a green color) when the linkage position of machine 10 is within the desired ranges during a digging operation. In some embodiments, display 68 may include an elongated light bar that illuminates either all at once when the linkage position is within the desired ranges, or gradually as the linkage nears optimal values within the desired ranges. FIG. 3 illustrates display 68 as being included in a stand-alone monitor that can be mounted within operator station 22. It is contemplated that the monitor could provide information other than related to linkage movement, if desired. For example, the monitor could also display engine RPM, an amount of fuel remaining in an onboard tank, whether training switch 56 is active, and other similar data. FIG. 4 illustrates display 68 as being a light bar that is mounted inside operator station 22, for example at an upright corner post thereof. FIG. 5 illustrates display 68 as being located outside of station 22, for example at stick 30. In this location, display 68 could embody LEDs mounted directly to an inner surface of stick 30 or simply an image that is projected onto the inside surface. If embodied as a projected image, display 68 could include a projector (not shown) mounted to an inner surface of boom 24, to an outer surface of operator station 22, or to a wall inside operator station 22. It is contemplated that display 68 could take other forms known in the art, if desired.

INDUSTRIAL APPLICABILITY

The disclosed excavation system may be applicable to any machine having linkage connected to a material-moving work tool. The disclosed excavation system may help to train an inexperienced or unskilled operator how to correctly position the linkage to extract and move a greatest amount of material with the work tool. Operation of excavation system 14 will now be described in detail.

During operation of machine 10, an operator may selectively implement the disclosed training program by manipulating switch 56. When switch 56 has been manipulated by the operator to activate the program, controller 54 may begin monitoring operation of machine 10. Specifically, controller 54 may monitor the pitch of undercarriage 44, the swing angle of frame 42 relative to undercarriage 44, the angle of boom 24 relative to frame 42, the angle of stick 30 relative to boom 24, and the angle of work tool 16 (i.e., of the flat bottom surface 52 of work tool 16) relative to stick 30. In addition, controller 54 may monitor the pressure(s) of hydraulic cylinders 28, 36, and/or 38.

Based on the signals from sensors 56-66, controller 54 may be configured to determine the angle α of stick 30 and the current operation of machine 10. For example, based on the pitch angle of undercarriage 44 relative to the force direction of gravity, the swing angle of frame 42 relative to undercarriage 44, the pivot angle of boom 24 relative to frame 42, and the pivot angle of stick 30 relative to boom 24, controller 54 may be configured to determine the pivot angle of stick 30 relative to the force direction of gravity using algorithms known in the art. It is contemplated that, in some embodiments, the pivot angle of stick 30 could alternatively be determined directly by way of a drop angle sensor (not shown) connected to stick 30, if desired. Controller 54 may also determine the current operation of machine 10 by comparing the signals from pressure sensor(s) 66 with one or more maps stored in memory.

When controller 54 determines that the current operation of machine 10 is a digging operation (e.g., based on an elevated pressure within any one or more of hydraulic cylinders 28, 36, 38), controller 54 may selectively cause display 68 to notify the operator of machine of the comparison between the current angle of stick 30 and the desired range of angles. Specifically, when the current angle of stick 30 is within about 0-35° away from frame 42, the current angle may be within the desired range and controller 54 may responsively cause display 68 to illuminate. In some embodiments, as the current angle of stick 30 approaches about 25° away from frame 42, display 68 may gradually increase its illumination. For example, the illuminated bar of display 68 may grow in length (i.e., a greater amount may be illuminated) and/or display 68 may illuminate at a greater intensity or in a different color. In some embodiments, the same display 68 or another display 68 may likewise illuminate when the pivot angle of work tool 16 is within a desired range and/or approaches an ideal value (e.g., about 90° relative to stick 30) within the desired range during the digging operation. When stick 30 (and/or work tool 16) is placed at an angle outside of the desired range, when machine 10 is not performing a digging operation, and/or when the training program is deactivated (e.g., by manipulation of switch 56), controller 54 may inhibit display 68 from illuminating and providing notification to the operator. In this manner, the operator may learn correct positioning of the linkage of machine 10 during digging based on whether display 68 is illuminated.

It is also contemplated that controller 54 may also selectively notify an operator when movement of the linkage of machine 10 could cause damage to machine 10. In particular, it may be possible in some instances to cause work tool 16 to strike against undercarriage 44 and/or frame 42. In these instances, and based on the signals from sensors 58-63, controller 54 may alert the operator before the potential for collision exceeds a threshold level. This alert may be generated by way of display 68 (e.g., by causing display 68 to illuminate in a red color) or via another display, as desired.

Several benefits may be associated with the disclosed excavation system. For example, because focus of the excavation system is directed toward engagement of work tool 16 with the material to be moved, the system may help ensure that work tool 16 is properly loaded during each phase of the excavation cycle. And proper loading of work tool 16 may result in higher productivity and efficiency of machine 10. In addition, although the system has been described with respect to an excavator, the system may likewise help with loading of a wheel loader's bucket, a dragline's shovel, or a dozer's ripper.

It will be apparent to those skilled in the art that various modifications and variations can be made to the disclosed excavation system. Other embodiments will be apparent to those skilled in the art from consideration of the specification and practice of the disclosed excavation system. It is intended that the specification and examples be considered as exemplary only, with a true scope being indicated by the following claims and their equivalents.

What is claimed is:

1. An excavation system for a machine, comprising:
   a work tool having a digging edge for penetrating and digging in a work surface at a material penetration angle;
   at least one linkage connecting the work tool to the machine, and configured to actuate the work tool to the material penetration angle, and each linkage having a linkage angle;
   at least one linkage angle sensor associated with each linkage and configured to generate a linkage angle signal indicative of the linkage angle of the associated linkage;
   a display; and
   a controller in communication with each linkage angle sensor and the display, the controller being configured to selectively cause the display to notify a user of the excavation system when each linkage angle and the penetration angle are within desired efficiency ranges, at least in part in response to each linkage angle signal.

2. The excavation system of claim 1, wherein the desired efficiency ranges are associated with a greatest potential amount of force transfer from the work tool into material moved by the work tool.

3. The excavation system of claim 1, wherein at least one of the linkage angle signals is indicative of the linkage angle of the associated linkage with respect to a force direction of gravity.

4. The excavation system of claim 3, wherein:
   the at least one linkage includes a first linkage, the first linkage including a boom, and a stick pivotally connected to the boom; and
   the linkage angle of the first linkage is an angle of the stick with respect to the force direction of gravity.

5. The excavation system of claim 1, wherein the display is on one of the linkages.

6. The excavation system of claim 5, wherein:
   the at least one linkage includes a first linkage, the first linkage including a boom, and a stick pivotally connected to the boom; and
   the display includes a light mounted on the stick and selectively illuminated to notify the user.

7. The excavation system of claim 5, wherein:
   the at least one linkage includes a first linkage, the first linkage including a boom, and a stick pivotally connected to the boom; and
   the display includes an image selectively projected onto the stick to notify the user.

8. The excavation system of claim 1, wherein:
   the machine further includes an operator station; and
   the display is mounted to an upright post inside of the operator station.

9. The excavation system of claim 1, wherein:
   the machine further includes an operator station; and
   the display includes a monitor mounted inside the operator station.

10. The excavation system of claim 1, wherein the controller is further configured to cause the display to notify the user based on movement of each linkage angle toward a desired linkage angle, and movement of the penetration angle toward a desired penetration angle within the desired efficiency ranges.

11. The excavation system of claim 1, wherein:
    the at least one linkage includes a first linkage, the first linkage including a boom and a stick pivotally connected to the boom; and
    the linkage angle sensors include a swing sensor, a boom angle sensor, a stick angle sensor, a work tool angle sensor, and a pitch sensor.

12. The excavation system of claim 11, wherein the controller is further configured to:
    determine a potential for collision of the work tool with the machine based on the linkage angle signals from the swing sensor, the boom angle sensor, and the stick angle sensor; and
    selectively generate a warning indicative of the potential for collision.

13. The excavation system of claim 11, wherein the controller is further configured to notify the user when the penetration angle is within a desired range of penetration angles associated with greater penetration of the work tool into material moved by the work tool.

14. The excavation system of claim 1, further including at least one pressure sensor configured to generate a signal indicative of a digging operation being performed by the work tool, and wherein the controller is further configured to cause the display to notify the user only when the signal indicates that the work tool is performing the digging operation.

15. A method of controlling an excavation machine having a work tool, comprising:
    sensing a linkage angle of at least one linkage connecting the work tool to the machine, the work tool having a digging edge for penetrating and digging in a work surface at a penetration angle; and
    generating a notification when the penetration angle is within a desired material penetration range of angles, based at least in part on the linkage angle.

16. The method of claim 15, wherein:
    the at least one linkage includes a first linkage, the first linkage including a boom pivotally connected to the excavation machine, and a second linkage, the second linkage including a stick pivotally connecting the work tool to the boom; and
    sensing the linkage angle of the at least one linkage includes sensing an angle of the stick relative to a force direction of gravity.

17. The method of claim 16, wherein the desired material penetration range of angles is associated with a greatest potential amount of force transfer from the work tool into material moved by the work tool.

18. The method of claim 17, wherein generating the notification includes illuminating a display on the stick.

19. The method of claim 15, further including:
    determining when the work tool is performing a digging operation; and
    generating the notification only when the work tool is performing the digging operation.

20. An excavation machine, comprising:
    traction devices;
    a frame configured to swing relative to the traction devices;
    a boom pivotally connected to the frame;
    a stick pivotally connected to the boom;
    a work tool pivotally connected to the stick;
    at least a first sensor configured to generate a signal indicative of an angle of the stick relative to a force direction of gravity;
    at least a second sensor configured to generate a signal indicative of a digging operation being performed by the work tool;
    a display; and
    a controller in communication with the at least a first and the at least a second sensors, the controller being configured to cause the display to notify a user of the excavation machine when the angle of the stick is within a desired material penetration range of angles that transfers a greatest potential amount of force from the work tool into material moved by the work tool, only when the work tool is performing the digging operation.

\* \* \* \* \*